(12) United States Patent
Girardey et al.

(10) Patent No.: US 10,908,011 B2
(45) Date of Patent: Feb. 2, 2021

(54) PHASE CONTROL UNIT FOR A VIBRONIC SENSOR

(71) Applicant: Endress + Hauser GmbH + Co. KG, Maulburg (DE)

(72) Inventors: Romuald Girardey, Blotzheim (FR); Manuel Sautermeister, Schopfheim (DE); Tobias Brengartner, Emmendingen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 529 days.

(21) Appl. No.: 15/737,793

(22) PCT Filed: Jun. 22, 2016

(86) PCT No.: PCT/EP2016/064402
§ 371 (c)(1),
(2) Date: Dec. 19, 2017

(87) PCT Pub. No.: WO2017/016760
PCT Pub. Date: Feb. 2, 2017

(65) Prior Publication Data
US 2019/0003874 A1    Jan. 3, 2019

(30) Foreign Application Priority Data
Jul. 29, 2015    (DE) .......................... 10 2015 112 421

(51) Int. Cl.
*G01F 23/296*    (2006.01)
*G01N 9/00*    (2006.01)
(Continued)

(52) U.S. Cl.
CPC .......... *G01F 23/2967* (2013.01); *G01K 11/26* (2013.01); *G01L 11/04* (2013.01);
(Continued)

(58) Field of Classification Search
CPC .. G01K 11/26; G01N 2009/006; G01N 9/002; G01N 9/24
See application file for complete search history.

(56) References Cited

U.S. PATENT DOCUMENTS

| 4,740,726 A | 4/1988 | Umezawa |
|---|---|---|
| 2004/0078164 A1 | 4/2004 | Lopatin et al. |

(Continued)

FOREIGN PATENT DOCUMENTS

| CN | 16 75523 A | 9/2005 |
|---|---|---|
| CN | 10 4767503 A | 7/2015 |

(Continued)

OTHER PUBLICATIONS

Office Action dated Sep. 24, 2019 in corresponding Chinese application No. 2016 80041191.3.

(Continued)

*Primary Examiner* — Michael J Dalbo
(74) *Attorney, Agent, or Firm* — Bacon & Thomas, PLLC (57) ABSTRACT

An apparatus and a method for determining and/or monitoring at least one process variable of a medium in a container, comprising: a mechanically oscillatable unit, a driving/receiving unit for exciting the mechanically oscillatable unit to execute mechanical oscillations by means of an electrical exciting signal and for receiving and transducing mechanical oscillations into an electrical, received signal, an electronics unit, which electronics unit is embodied, to produce the exciting signal starting from the received signal, to set a predeterminable phase shift ($\Delta\phi$) between the exciting signal and the received signal, and from the received signal, to determine and/or to monitor the at least one process variable. A phase correction unit is provided, which phase correction unit is at least embodied, to ascertain a phase correction value ($\Delta\phi_{kor}$) from at least one process parameter dependent, characteristic variable of at least one (Continued)

component of the apparatus, especially the driving/receiving unit, and to set the predeterminable phase shift ($\Delta\phi$) in accordance with the phase correction value ($\Delta\phi_{kor}$).

21 Claims, 3 Drawing Sheets

(51) Int. Cl.
    *G01N 11/16*      (2006.01)
    *G01K 11/26*      (2006.01)
    *G01L 11/04*      (2006.01)

(52) U.S. Cl.
    CPC ............. *G01N 9/002* (2013.01); *G01N 11/16* (2013.01); *G01N 2009/006* (2013.01)

(56) References Cited

U.S. PATENT DOCUMENTS

| | | | |
|---|---|---|---|
| 2006/0131994 A1* | 6/2006 | D'Angelico | G01F 23/2967 310/317 |
| 2006/0145774 A1* | 7/2006 | D'Angelico | B06B 1/023 331/158 |
| 2007/0284550 A1* | 12/2007 | Smith | G01F 1/22 250/573 |
| 2009/0205411 A1 | 8/2009 | Muller | |
| 2010/0083750 A1 | 4/2010 | D'Angelico et al. | |
| 2013/0104647 A1* | 5/2013 | Lopatin | G01F 23/00 73/292 |

FOREIGN PATENT DOCUMENTS

| | | |
|---|---|---|
| CN | 20 4439171 U | 7/2015 |
| DE | 3 734 077 A1 | 4/1989 |
| DE | 37 34 077 A1 | 4/1989 |
| DE | 100 57 974 A1 | 5/2002 |
| DE | 102 37 931 A1 | 2/2004 |
| DE | 10 2005 015 547 A1 | 10/2006 |
| DE | 10 2011 090 015 A1 | 7/2013 |
| DE | 10 2015 112 421 A1 | 2/2017 |
| WO | 2004/018974 A2 | 3/2004 |
| WO | 2004 034003 A1 | 4/2004 |
| WO | 2004/034003 A1 | 4/2004 |
| WO | 2008 009523 A1 | 1/2008 |
| WO | 2013/097991 A1 | 7/2013 |

OTHER PUBLICATIONS

German Search Report, German PTO, Munich, dated May 12, 2016.
International Search Report, EPO, the Netherlands, dated Sep. 21, 2016.

* cited by examiner

PHASE CONTROL UNIT FOR A VIBRONIC SENSOR

TECHNICAL FIELD

The invention relates to an apparatus as well as to a method for determining and/or monitoring at least one process variable of a medium. The apparatus is a vibronic sensor and the at least one process variable is, for example, a fill level, a flow, a density and/or a viscosity of the medium.

BACKGROUND DISCUSSION

Vibronic sensors are widely applied in process and/or automation technology. In the case of fill-level measuring devices, such have at least one mechanically oscillatable unit, such as, for example, an oscillatory fork, a single rod or a membrane. Such is excited during operation by means of a driving/receiving unit, frequently in the form of an electromechanical transducer unit, to execute mechanical oscillations. The electromechanical transducer unit can be, for example, a piezoelectric drive or an electromagnetic drive. The mechanically oscillatable unit can in the case of flow measuring devices, however, also be embodied as an oscillatable pipe or tube, through which the medium flows, such as, for example, in the case of a measuring device working according to the Coriolis principle.

Corresponding field devices are produced by the company, Endress+Hauser in great variety and, in the case of fill-level measuring devices, sold, for example, under the mark, LIQUIPHANT or SOLIPHANT. The underpinning measuring principles are basically known from a large number of publications. The driving/receiving unit excites the mechanically oscillatable unit by means of an electrical exciting signal to execute mechanical oscillations. Conversely, the driving/receiving unit can receive the mechanical oscillations of the mechanically oscillatable unit and transduce such into an electrical, received signal. The driving/receiving unit is correspondingly either a separate driving unit and a separate receiving unit, or a combined driving/receiving unit.

The driving/receiving unit is in many cases part of a fed back, electrical, oscillatory circuit, by means of which the exciting of the mechanically oscillatable unit to execute mechanical oscillations occurs. For example, for a resonant oscillation, the oscillatory circuit condition must be fulfilled, according to which the sum of all amplifications in the oscillatory circuit, or the amplification factor, is ≥1 and all phases arising in the oscillatory circuit sum to a multiple of 360°.

For exciting and fulfilling the oscillatory circuit condition, a certain phase shift between the exciting signal and the received signal must be assured. Therefore, frequently, a predeterminable value is set for the phase shift, thus a desired value for the phase shift between the exciting signal and the received signal. Known for this from the state of the art are the most varied of solutions, both analog as well as also digital. In principle, the adjusting of the phase shift can be performed, for example, by applying a suitable filter, or also by means of a control loop controlled to a predeterminable phase shift, the desired value. Known from German patent publication, DE102006034105A1, for example, is a tunable phase shifter. The additional integration of an amplifier with adjustable amplification factor for additional control of the oscillation amplitude is, in contrast, described in German patent publications, DE102007013557A1 and DE102005015547A1 provides the application of an allpass filter. The adjusting of the phase shift is, moreover, possible by means of a frequency sweep, such as, for example, disclosed in German patent publications, DE102009026685A1, DE102009028022A1, and DE102010030982A1. The phase shift can, however, also be controlled by means of a phase locked loop (PLL) to a predeterminable value. Such an excitation method is the subject matter of DE102010030982A1.

Both the exciting signal as well as also the received signal are characterized by frequency f, amplitude A and/or phase φ. Correspondingly, changes in these variables are usually taken into consideration for determining the process variable, such as a predetermined fill level, a flow, the density and/or the viscosity. In the case of a vibronic limit level switch for liquids, for example, it is distinguished whether the oscillatable unit is covered by the liquid or freely oscillating. These two states, the free state and the covered state, are distinguished, in such case, for example, based on different resonance frequencies, thus a frequency shift, in the case of presence of a predeterminable phase shift between exciting signal and received signal. The density and/or viscosity can, in turn, be ascertained with such a measuring device only when the oscillatable unit is covered by the medium.

Known from German patent publication, DE10057974A1 for determining and/or monitoring the density of a medium are a method and an apparatus, by means of which the influence of at least one disturbing variable, for example, viscosity, on the oscillation frequency of the mechanically oscillatable unit is ascertained and correspondingly compensated. Described in German patent publication, DE102006033819A1, furthermore, is the setting of a predeterminable phase shift between the exciting signal and the received signal, a phase shift where effects of changes of the viscosity of the medium on the mechanical oscillations of the mechanically oscillatable unit are negligible. In such case, the density is determined essentially according to the formula $$\rho_{Med} = \frac{1}{K}\left[\left(\frac{f_{0,Vak} + C \cdot t + A \cdot t^2}{f_{T,P,Med}}\right)^2 \cdot (1 + D \cdot p) - 1\right]$$

wherein K is the density sensitivity of the mechanically oscillatable unit, $f_{0,Vak}$ the frequency of the mechanical oscillations in vacuum, C and A, respectively, the linear and quadratic temperature coefficients of the mechanically oscillatable unit, t the process temperature, $f_{T,P,Med}$ the frequency of the mechanical oscillations in the medium, D the pressure coefficient, and p the pressure of the medium.

The viscosity of a medium can be determined by means of a vibronic sensor based on the phase versus frequency curve (φ=g(f)), such as described, for example, in German patent publication, DE10050299A1. This procedure is based on the dependence of the damping of the oscillatable unit on the viscosity of the medium. In such case, the lower the viscosity is, the steeper is the phase versus frequency curve. In order to eliminate the influence of density on the measuring, the viscosity is determined based on a frequency change caused by two different values for the phase, thus by means of a relative measurement. In this regard, either two different phase values can be set and the associated frequency change determined, or a predetermined frequency band is moved through and it is detected when at least two predetermined phase values are achieved.

Known from German patent publication, DE102007043811A1, moreover, is to ascertain from a change of the eigenfrequency and/or resonant frequency and/or the phase relationship a change of the viscosity and/or to determine the viscosity based on correspondingly furnished dependencies of the oscillations of the oscillatable unit on the viscosity of the medium. Also in the case of this procedure, the dependence of the viscosity on the density of the medium must be taken into consideration.

In the case of each of the process variables, fill level, density and viscosity, thus the determination depends, as a rule, directly on the setting of a predeterminable phase shift between exciting signal and received signal. Thus, it is clear that also the accuracy of measurement of a corresponding measuring device depends on the accuracy of tuning of the phase shift. This is true in especially high measure for the case of determining viscosity and/or density, whose reliable determination requires a phase tuning accuracy of, for instance, 1°.

The phase shift between exciting signal and received signal present at a certain point in time results always from summation of the phases caused by the utilized components. Depending on application, a certain predeterminable phase shift is set, usually as required for a certain condition for the oscillatory behavior, such as, for example, the presence of a resonant oscillation. During the operation of the vibronic sensor, then, for example, the phase shift present at a certain point in time is always controlled to the value of the predeterminable phase shift.

Now it is, however, also the case that so-called process parameters can have an influence on the phase shift, and via this influence can, in turn, negatively affect the accuracy of measurement of the measuring device. Especially, a change of at least one process parameter can bring about a change of the phase caused by a certain component of the vibronic sensor. In this case, it can happen that a controlling to a generally, at least at times, constant value for the predeterminable phase shift no longer leads to the condition linked therewith being exactly fulfilled. The oscillatory behavior of the vibronic sensor is modified and thereby the accuracy of the determining of the process variable of interest is reduced.

SUMMARY OF THE INVENTION

Starting from this picture of the problems with the prior art, an object of the present invention is to provide an apparatus as well as a method for determining at least one process variable of a medium, wherein both the apparatus as well as the method are distinguished by an especially high accuracy of measurement.

This object is achieved by an apparatus for determining and/or monitoring at least one process variable of a medium in a container, comprising
 a mechanically oscillatable unit,
 a driving/receiving unit for exciting the mechanically oscillatable unit to execute mechanical oscillations by means of an electrical exciting signal and for receiving and transducing mechanical oscillations into an electrical, received signal, and
 an electronics unit, which electronics unit is embodied,
  to produce the exciting signal starting from the received signal,
  to set a predeterminable phase shift between the exciting signal and the received signal, and,
  from the received signal, to determine and/or to monitor the at least one process variable, and wherein a phase correction unit is provided, which phase correction unit is at least embodied
  to ascertain a phase correction value from at least one process parameter dependent, characteristic variable of at least one component of the apparatus, especially the driving/receiving unit, and
  to set the predeterminable phase shift in accordance with the phase correction value.

The present invention concerns thus a vibronic sensor with a phase correction unit. By means of the phase correction unit, the influence of at least one process parameter on the measuring can be eliminated and thereby a clearly increased accuracy of measurement achieved. If of concern, for example, in the case of the process variable to be determined and/or monitored, is a predetermined fill level, then the apparatus of the invention permits an increased accuracy in the adjusting of a predeterminable phase shift, wherein the reaching of the predetermined fill level is ascertainable in this case based on the received signal at the predeterminable phase shift. In the case, in which the density of the medium is to be determined, equivalent considerations hold. A special advantage results, however, for determining the viscosity and/or density, in the case of which the accuracy of measurement goes hand-in-hand with the tuning accuracy of the predeterminable phase shift.

If the phase shift changes, for example, due to the change of at least one process parameter, then this leads, in given cases, to the occurrence of an additional phase. Then the adjusting of the phase shift to the, as a rule, at least at times, constant value for the predeterminable phase shift, in given cases, no longer assures that a condition (such as, for example, the presence of a resonant oscillation) set up relative to the oscillatory behavior of the oscillatable unit is fulfilled. From this, there results, in turn, in given cases, an inaccuracy in the determining of the measured variable, such as, for example, the frequency and/or the particular process variable. By means of the phase correction unit of the invention, now the predeterminable phase shift can be suitably set, such that the determining, or ascertaining, of the measured variable and/or process variable can occur largely uninfluenced by the at least one process parameter, especially uninfluenced by a change of the at least one process parameter.

In a preferred embodiment, the driving/receiving unit includes at least one piezoelectric element or at least one coil. Of concern is thus preferably a piezoelectric driving/receiving unit characterized by at least one capacitance or a magnetic driving/receiving unit characterized by at least one inductance. At least this capacitance or inductance depends on the particular process and therewith on at least one process parameter, for example, the process temperature. As a result, also the phase brought about by at least the capacitance or inductance, and, associated therewith, the phase shift present between exciting signal and received signal, depend on the at least one process parameter. The influencing of the phase caused by the driving/receiving unit by at least one process parameter is basically relatively large due to its arrangement in the direct vicinity of the process. The phase correction unit is therefore preferably used for eliminating the influence of at least one process parameter on the phase brought about by the driving/receiving unit.

It is to be noted here that, besides the mentioned examples, many other arrangements, principles and/or embodiments of electromagnetic transducer units as driving/receiving unit are applicable and likewise fall within the scope of the present invention.

Usually, the phase brought about by a component of the vibronic sensor is characterized by at least one variable, especially a characteristic variable. In such case, of concern is a physical or chemical variable, which is directly related to the properties of the component. Advantageously, in such case, the characteristic variable is at least one process parameter dependent, capacitance or inductance of at least one component of the driving/receiving unit or at least one time constant dependent on at least one process parameter. In the case of operating the vibronic sensor by means of an electrical, alternating signal, such as normally the case, the capacitance or inductance are directly related via a mathematical relationship with a time constant, which, besides the capacitance or inductance, can also be taken into consideration as characteristic variable. Of course, when the influence of at least one process parameter on another component of the vibronic sensor is to be eliminated, also other characteristic variables can be taken into consideration. Thus, the characteristic variables mentioned here in reference to the component of the driving/receiving unit do not form an exclusive list.

The terminology, process parameter, means basically a physical and/or chemical variable characterizing the process, within which the vibronic sensor is being used. In a preferred embodiment, the at least one process parameter is the process temperature or the process pressure. Both variables influence especially the driving/receiving unit. The at least one process parameter can, however, also be some other parameter, especially of the medium of the process.

In an especially preferred embodiment, the phase correction unit includes at least one reference branch, which includes at least one electrical component, which is connected in parallel with at least one component of the apparatus, especially the driving/receiving unit, and contactable with the exciting signal. The at least one electrical component, in such case, as a rule, either does not come in contact with the process, so that it is not influenced by the at least one process parameter, or the process conditions have no influence on the component.

For example, for the embodiment of the phase correction unit with a reference branch, the phase correction value can be ascertained from a comparison of the at least one characteristic variable of the at least one component of the vibronic sensor and a corresponding reference variable, which is ascertained from a reference signal of the reference branch and which represents the electrical component connected in parallel with the at least one component of the vibronic sensor. However, also other methods for determining the phase correction value are possible, which likewise fall within the scope of the present invention.

Advantageously, the reference branch includes at least one reference capacitance or reference inductance. In this case, the component of the apparatus is preferably a piezoelectric or magnetic driving/receiving unit. Further advantageously, the reference capacitance and at least one capacitance of the driving/receiving unit or the reference inductance and at least one inductance of the driving/receiving unit have the same value.

Likewise advantageously, the reference branch includes at least one reference resistor, especially a reference resistor connected in series with the at least one electrical component. In this case, the reference branch forms, for example, a so-called RC- or RL-unit. This embodiment is suited for the case, in which, with reference to the at least one component of the apparatus, a time constant is to serve as a characteristic variable.

In a preferred embodiment, the phase correction unit includes at least one time measuring unit. The time measuring unit enables determining a time constant serving as characteristic variable.

In such case, the time measuring unit advantageously includes at least one timer-chip or at least one XOR-unit, especially an XOR-gate, and at least one counter. Furthermore advantageously, the time measuring unit includes a switch element, wherein the electronics unit is embodied, by means of the switch element, to forward to the time measuring unit a reference signal of the reference branch in a first time interval and a process signal based on the at least one component of the apparatus in a second time interval. Through application of the switch element, one time measuring unit is sufficient for evaluating both the reference signal as well as also the process signal and both for the reference branch as well as also for the at least one component to ascertain the relevant time constant serving as characteristic variable and therefrom, in turn, to ascertain the phase correction value.

In a preferred embodiment, an explosion protection circuit is added. This permits operating a field device in an explosive atmosphere and must satisfy correspondingly different requirements, in order, for example, to prevent a spark formation, which, in given cases, could trigger an explosion, or in order to avoid that a spark occurring in the interior of a closed space affects the environment. In this regard, different protection types are distinguished, and, correspondingly, there are different standards for different environmental conditions and applications. The standard DINEN60079-11 defines the required safety provisions for device protection using intrinsic safety, known under the acronym Ex-i. In such case, of concern is an ignition protection type, which rests on limiting electrical energy within devices and/or connecting lines exposed to possibly explosive atmospheres to a level below that, in the case of which an ignition can be brought about either by spark formation or heating. It must thus especially be assured that the electrical variables, electrical current, voltage and power in a device at any time, in each case, lie below a predetermined limit value. These limit values are so selected that, in the case of malfunction, e.g. by a short circuit, the maximum occurring heat is not sufficient to bring about an ignition sparking. In this regard, circuits are applied, in the case of which the electrical current frequently through resistances, the voltage through diodes, especially Zener-diodes, and the power is kept below the predetermined limit values by a suitable combination of electrical current- and voltage-limiting components.

In an embodiment, the explosion protection circuit includes at least one electrical resistor.

In an additional embodiment, the at least one process variable is a predeterminable fill level, the density, and/or the viscosity of the medium in the container.

The object of the invention is achieved, furthermore, by a method for determining and/or monitoring at least one process variable of a medium in a container wherein a mechanical oscillatable unit is excited by means of an exciting signal to execute mechanical oscillations, wherein the mechanical oscillations of the mechanically oscillatable unit are received and transduced into an electrical, received signal, wherein the exciting signal is produced starting from the received signal, wherein a predeterminable phase shift is set between the exciting signal and received signal, wherein the at least one process variable is determined and/or monitored from the received signal,
wherein a phase correction value is ascertained from at least one characteristic variable dependent on at least one process parameter, and
wherein the predeterminable phase shift is set in accordance with the phase correction value.

Advantageously, the process parameter is the process temperature or the process pressure.

Furthermore advantageously, selected as characteristic variable is at least one capacitance or inductance dependent on at least one process parameter or at least one time constant dependent on at least one process parameter.

In a preferred embodiment of the method, ascertained as characteristic variable is a first time constant dependent on at least one process parameter, wherein based on a reference signal a second time constant independent of the at least one process parameter is ascertained, and wherein the phase correction value is ascertained from a comparison of the first and second time constants.

The implementing of a phase correction unit of the invention in combination with a method of the invention permits numerous other applications.

Thus, according to an embodiment, the process temperature is determined from at least one process temperature dependent, and/or process pressure dependent, capacitance or inductance of at least one component of the driving/receiving unit. The process temperature can be ascertained, for example, based on a characteristic curve of the inductance and/or capacitance as a function of temperature, which, in turn, can be furnished, for example, within the electronics unit. In the case of known capacitance, or inductance, as well as known process temperature, furthermore, the process pressure can be deduced.

In an additional embodiment of the method, from at least one process temperature dependent, and/or process pressure dependent, capacitance or inductance of at least one component of the driving/receiving unit, the presence of a short circuit or shunt connection can be deduced. Especially when the value of the capacitance and/or inductance lies outside a predeterminable interval, the presence of a short circuit or shunt can be deduced from this.

The embodiments explained with regard to the apparatus can be applied mutatis mutandis also for the proposed method and vice versa.

BRIEF DESCRIPTION OF THE DRAWINGS

The invention as well as its advantageous embodiments will now be described in greater detail based on the appended drawing, the figures of which show as follows.

DETAILED DISCUSSION IN CONJUNCTION WITH THE DRAWINGS

Figure 1:
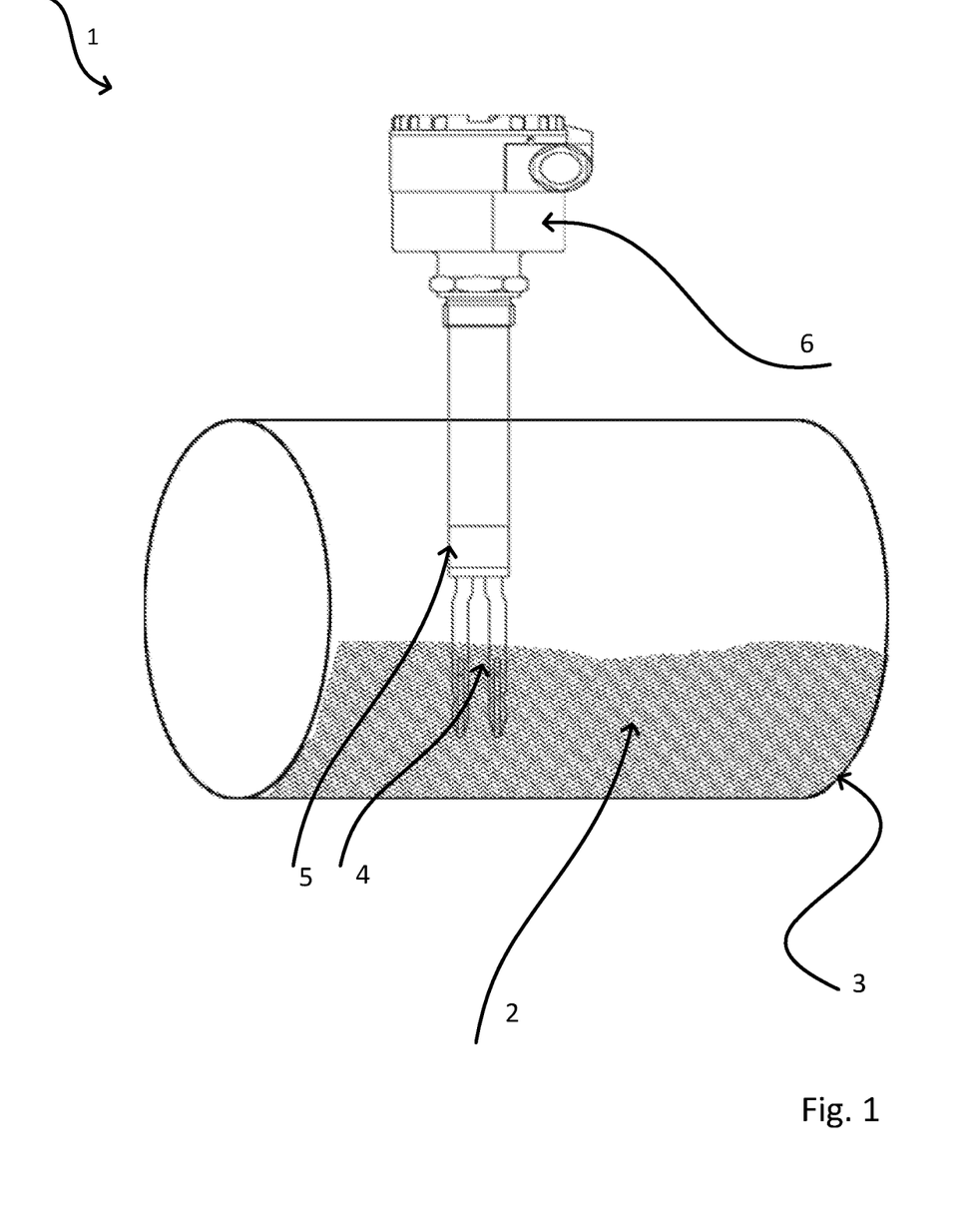
FIG. 1 is a schematic view of a vibronic sensor according to the state of the art.

FIG. 1 shows an apparatus 1 in the form of a vibronic sensor 1 for determining and/or monitoring at least one process variable. Included is an oscillatable unit 4 in the form of an oscillatory fork, which is immersed partially in a medium 2, which is located in a container 3. Oscillatable unit 4 is excited by means of the driving/receiving unit 5 to execute mechanical oscillations, and can be, for example, a piezoelectric stack- or bimorph drive. However, also other embodiments of a vibronic sensor fall within the scope of the invention. Furthermore, an electronics unit 6 is shown, by means of which signal registration, —evaluation and/or— feeding occurs.

The following description relates to a phase correction unit 7 having a reference branch 8, which is connected in parallel with a driving/receiving unit 5 having at least one piezoelectric element characterized by a capacitance $C_{AE}$ and which has a reference capacitance $C_{ref}$. The ideas presented in connection with the following figures can be transferred directly to other components of the vibronic sensor 1 or to other embodiments of the driving/receiving unit 5.

Figure 2:
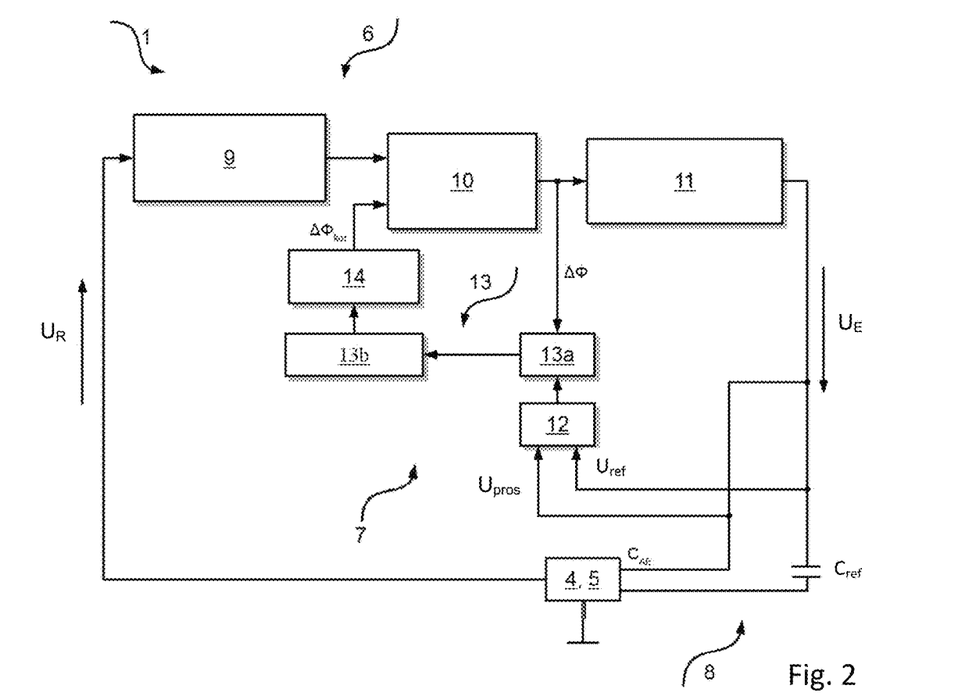
FIG. 2 is a block diagram of a first embodiment of the invention.

FIG. 2 shows a block diagram of a first embodiment of a vibronic sensor of the invention having a corresponding phase correction unit 7. Oscillatable unit 4 is not separately shown in this view. It is located, however, in the direct vicinity of the driving/receiving unit 5. By means of an electrical exciting signal $U_E$ and by means of the driving/receiving unit 5, the mechanically oscillatable unit is caused to execute mechanical oscillations. These mechanical oscillations are, in turn, received by means of the driving/receiving unit 5 and transduced into an electrical, received signal $U_R$, which is fed to an electronics unit 6, which includes at least one input stage 9, a control- and evaluation unit 10 at least for adjusting the predeterminable phase shift $\Delta\phi$ between exciting signal $U_E$ and received signal $U_R$ and for determining and/or monitoring at least one process variable, as well as an output stage 11.

The phase correction unit 7 includes a reference branch 8, a switch element 12 and a time measuring unit 13 in the form of an XOR-unit 13a and a counter 13b. In the example shown here, the phase correction unit 7 includes, furthermore, an evaluation unit 14 for ascertaining the phase correction value $\Delta\phi_{kor}$. This value is fed to the control- and evaluation unit 10, in order that the predeterminable phase shift between exciting signal $U_E$ and received signal $U_R$ can be set corresponding to the influence of at least one process parameter.

The exciting signal $U_E$ is, on the one hand, fed to the driving/receiving unit 5 and, on the other hand, to the reference branch 8. For ascertaining the phase correction value $\Delta\phi_{kor}$, a process signal $U_{pros}$ from the driving/receiving unit and a reference signal $U_{ref}$ from the reference branch 8 are fed to a switch element, in such a manner that in a first time interval the process signal is fed to the time measuring unit 13, and in a second time interval the reference signal. Of course, in the event that two time measuring units 13 are provided, a switch element would be no longer necessary.

Figure 3:
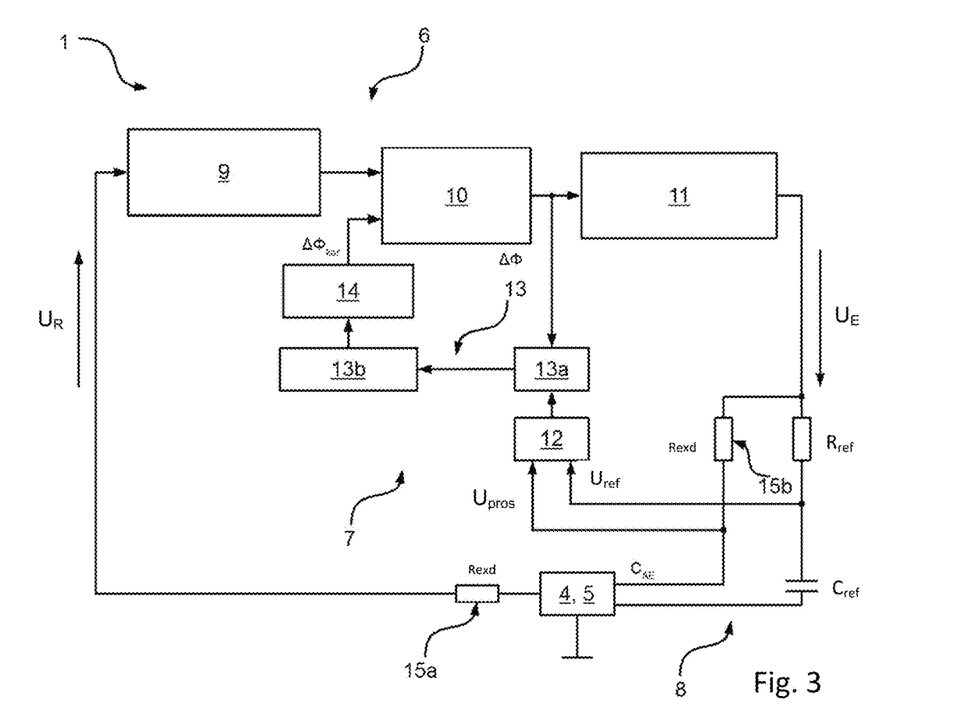
FIG. 3 is a block diagram of a second embodiment of the invention, including an explosion protection circuit.

FIG. 3 shows a similar block diagram of an apparatus 1 of the invention, in the case of which, supplementally, an explosion protection circuit 15 is provided, which includes at least the two resistors 15a, 15b, which are connected, respectively, after and in front of the driving/receiving unit. Otherwise the circuit is identical with that of FIG. 2, so that further explanation would be repetitive.

Figure 4:
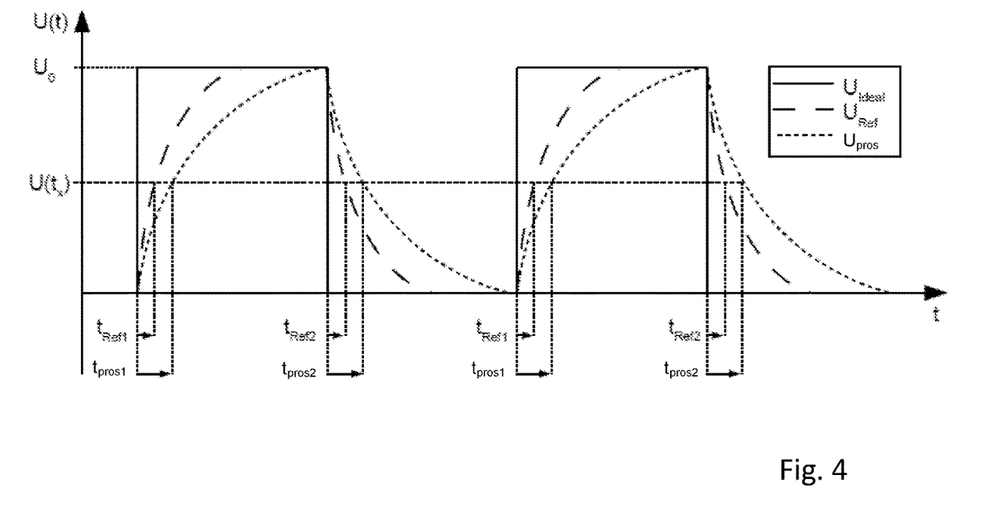
FIG. 4 is the process signal and the reference signal of an apparatus of FIG. 2 or 3 as a function of time.

FIG. 4 serves, finally, for illustrating the determining of the phase correction value $\Delta\phi_{kor}$ based on a time constant of the capacitance C of the driving/receiving unit 5. Shown are the ideal exciting signal $U_{ideal}$ in the form of a rectangular signal, the process signal $U_{pros}$ and the reference signal $U_{ref}$, all as functions of time. The process signal $U_{pros}$ and the reference signal $U_{ref}$ are fed in different time intervals to the time measuring unit 13.

For determining the phase correction value $\Delta\phi_{kor}$, the durations of the charging- and discharging of the capacitances $C_{AE}$ and $C_{ref}$ are considered for n signal periods of the exciting signal $U_{ideal}$ both for the process signal $U_{pros}(t)$ as well as also for the reference signal $U_{ref}(t)$, as ascertained by means of the time measuring unit.

For the process signal $U_{pros}$, there results for the duration $t_{pros}$ of the charging- and discharging of the capacitance C over n signal periods of the exciting signal $U_{ideal}$, $$t_{pros} = nt_{pros1} + nt_{pros2},$$

wherein $t_{pros1}$ is the duration of charging and $t_{pros2}$ the duration of discharging. Analogously, there results in the case of the reference signal for the corresponding duration $t_{ref}$ $$t_{ref} = nt_{ref1} + nt_{ref2}.$$

Using the formulas generally known from the state of the art for charging and discharging of a capacitor with capacitance C, there results for the duration of the charging- and discharging in the case of the process signal $U_{pros}$ $$t_{pros} = n\left[-\tau_{pros} * \ln\left(1 - \frac{U_{pros}(t_{pros1})}{U_0}\right)\right] + n\left[-\tau_{pros} * \ln\left(\frac{U_{pros}(t_{pros2})}{U_0}\right)\right]$$

$$t_{pros} = -n\tau_{pros} * \left[\ln\left(1 - \frac{U_{pros}(t_{pros1})}{U_0}\right) + \ln\left(\frac{U_{pros}(t_{pros2})}{U_0}\right)\right],$$

wherein $U_0$ is the amplitude of the ideal exciting signal $U_{ideal}$.

Analogously, there results in the case of the reference signal $U_{ref}$:

$$t_{ref} = n\left[-\tau_{ref} * \ln\left(1 - \frac{U_{ref}(t_{ref1})}{U_0}\right)\right] + n\left[-\tau_{ref} * \ln\left(\frac{U_{ref}(t_{ref2})}{U_0}\right)\right]$$

$$t_{ref} = -n\tau_{ref} * \left[\ln\left(1 - \frac{U_{ref}(t_{ref1})}{U_0}\right) + \ln\left(\frac{U_{ref}(t_{ref1})}{U_0}\right)\right]$$

Using the boundary condition:

$$U_{pros}(t_{pros1}) = U_{ref}(t_{ref1}) = U_{pros}(t_{pros2}) = U_{ref}(t_{ref2}) = !U(t_x),$$

it follows that:

$$t_{pros} = -n\tau_{proz} * \left[\ln\left(1 - \frac{U(t_x)}{U_0}\right) + \ln\left(\frac{U(t_x)}{U_0}\right)\right],$$

and $$t_{ref} = -n\tau_{ref} * \left[\ln\left(1 - \frac{U(t_x)}{U_0}\right) + \ln\left(\frac{U(t_x)}{U_0}\right)\right].$$

The phase correction value $\Delta\phi_{kor}$ can then be ascertained, for example, from the difference of the durations $t_{ref}$ and $t_{pros}$. There results $$t_{ref} - t_{pros} = -n\tau_{ref} * \left[\ln\left(1 - \frac{U(t_x)}{U_0}\right) + \ln\left(\frac{U(t_x)}{U_0}\right)\right] +$$

$$n\tau_{pros} * \left[\ln\left(1 - \frac{U(t_x)}{U_0}\right) + \ln\left(\frac{U(t_x)}{U_0}\right)\right]$$

$$t_{ref} - t_{pros} = n(\tau_{pros} - \tau_{ref})\left[\ln\left(1 - \frac{U(t_x)}{U_0}\right) + \ln\left(\frac{U(t_x)}{U_0}\right)\right]$$

The time difference $t_{ref} - t_{pros}$ can then, for example, be referenced to $t_{ref}$. From this, it follows that:

$$\frac{t_{ref} - t_{pros}}{t_{ref}} = -\frac{(\tau_{pros} - \tau_{ref})}{\tau_{ref}} = \frac{(\tau_{ref} - \tau_{pros})}{\tau_{ref}} = \frac{(C_{ref} - C_{AE})}{C_{ref}},$$

from which, in turn, the phase correction value $\Delta\phi_{kor}$ can be ascertained.

Alternatively, the durations of the discharging- and charging in the reference branch $t_{ref}$ and in the process branch $t_{pros}$ can also be directly referenced to one another:

$$\frac{t_{pros}}{t_{ref}} = -\frac{\tau_{pros}}{\tau_{ref}} = \frac{C_{AE}}{C_{ref}}.$$

Finally, it is to be noted that the durations $t_{ref}$ and $t_{pros}$ can, in each case, also be determined by considering either only the charging or only the discharging of the capacitances $C_{AE}$ and $C_{ref}$ for the process signal $U_{pros}$ and for the reference signal $U_{ref}$.

The invention claimed is:

1. An apparatus for determining and/or monitoring at least one process variable of a medium in a container, comprising:
   a mechanically oscillatable unit;
   a driving/receiving unit for exciting said mechanically oscillatable unit to execute mechanical oscillations by means of an electrical exciting signal and for receiving and transducing mechanical oscillations into an electrical, received signal; and
   an electronics unit, which is embodied,
     to produce the exciting signal based on the received signal,
     to set a predeterminable phase shift between the exciting signal and the received signal, and,
     from the received signal, to determine and/or to monitor the at least one process variable
   wherein said apparatus comprises a phase correction unit, which is at least embodied
     to ascertain a phase correction value ($\Delta\Phi_{kor}$) from at least one process parameter dependent, characteristic variable of at least one component of the apparatus, wherein the characteristic variable is at least one process parameter dependent capacitance ($C_{AE}$) or inductance of at least one component of the driving/receiving unit or at least one time constant ($\tau_{pros}, \tau_{ref}$) dependent on at least one process parameter, and
     to set the predeterminable phase shift ($\Delta\Phi$) in accordance with the phase correction value ($\Delta\Phi_{kor}$).

2. The apparatus as claimed in claim 1, wherein:
   said driving/receiving unit includes at least one piezoelectric element or at least one coil.

3. The apparatus as claimed in claim 1, wherein:
   the at least one process parameter is the process temperature or the process pressure.

4. The apparatus as claimed in claim 1, wherein:
   said phase correction unit includes at least one reference branch, which includes at least one electrical component, which is connected in parallel with at least one component of the apparatus, and is contactable with the exciting signal.

5. The apparatus as claimed in claim 4, wherein:
said reference branch includes at least one reference capacitance or reference inductance.

6. The apparatus as claimed in claim 5, wherein:
said reference capacitance and at least one capacitance of said driving/receiving unit or the reference inductance and at least one inductance of said driving/receiving unit have the same value.

7. The apparatus as claimed in claim 4, wherein:
said reference branch includes at least one reference resistor.

8. The apparatus as claimed in claim 7, wherein:
said at least one reference resistor is connected in series with said at least one electrical component.

9. The apparatus as claimed in claim 4, wherein:
said at least one electrical component is connected in parallel with said driving/receiving unit.

10. The apparatus as claimed in claim 1, wherein:
said phase correction unit includes at least one time measuring unit.

11. The apparatus as claimed in claim 10, wherein:
said time measuring unit includes at least one timer-chip or at least one XOR unit and at least one counter.

12. The apparatus as claimed in claim 10, wherein:
said time measuring unit includes a switch element;
said electronics unit is embodied, by means of said switch element, to forward to said time measuring unit a reference signal of said reference branch in a first time interval and a process signal based on the at least one component of the apparatus in a second time interval.

13. The apparatus as claimed in claim 1, further comprising:
an explosion protection circuit.

14. The apparatus as claimed in claim 13, wherein:
said explosion protection circuit includes at least one electrical resistor.

15. The apparatus as claimed in claim 1, wherein:
said at least one process variable is a predeterminable fill level, the density, and/or the viscosity of the medium in the container.

16. The apparatus as claimed in claim 1, wherein the phase correction value ($\Delta\Phi_{kor}$) is ascertained from at least one process parameter dependent, characteristic variable of said driving/receiving unit.

17. A method for determining and/or monitoring at least one process variable of a medium in a container, comprising the steps of:
exciting a mechanical oscillatable unit by means of an exciting signal to execute mechanical oscillations, wherein the mechanical oscillations of the mechanically oscillatable unit are received and transduced into an electrical, received signal;
producing the exciting signal starting from the received signal;
setting a predeterminable phase shift between the exciting signal and the received signal;
determining the at least one process variable and/or monitored from the received signal;
ascertaining a phase correction value ($\Delta\Phi_{kor}$) from at least one characteristic variable dependent on at least one process parameter;
wherein the characteristic variable is at least one process parameter dependent capacitance ($C_{AE}$) or inductance of at least one component of the driving/receiving unit or at least one time constant ($\tau_{pros}$, $\tau_{ref}$) dependent on at least one process parameter, and
setting the predeterminable phase shift in accordance with the phase correction value ($\Delta\Phi_{kor}$).

18. The method as claimed in claim 17, wherein:
the process parameter is the process temperature or the process pressure.

19. The method as claimed in claim 17, wherein:
ascertained as characteristic variable is a first time constant dependent on at least one process parameter;
based on a reference signal a second time constant independent of the at least one process parameter is ascertained; and
the phase correction value ($\Delta\Phi_{kor}$) is ascertained from a comparison of the first time constant and the second time constant.

20. The method as claimed in claim 17, wherein:
the process temperature is determined from at least one process temperature dependent and/or process pressure dependent capacitance or inductance of at least one component of the driving/receiving unit.

21. The method as claimed in claim 17, wherein:
from at least one process temperature dependent and/or process pressure dependent capacitance or inductance of at least one component of the driving/receiving unit, the presence of a short circuit or shunt connection is deduced.

* * * * *